United States Patent
Millet et al.

(10) Patent No.: US 12,011,004 B2
(45) Date of Patent: Jun. 18, 2024

(54) COMPOSITE PLANT-MCT FLOUR, METHOD OF MANUFACTURE, AND FOOD PRODUCTS MADE THEREFROM

(71) Applicant: INNOVATIVE FLOURS, LLC, Cottonwood Heights, UT (US)

(72) Inventors: Gary Millet, Salt Lake City, UT (US); Kylin Liao, Nanjing (CN)

(73) Assignee: INNOVATIVE FLOURS, LLC, Cottonwood Heights, UT (US)

( * ) Notice: Subject to any disclaimer, the term of this patent is extended or adjusted under 35 U.S.C. 154(b) by 36 days.

(21) Appl. No.: 17/972,037

(22) Filed: Oct. 24, 2022

(65) Prior Publication Data

US 2024/0108015 A1    Apr. 4, 2024

Related U.S. Application Data

(60) Provisional application No. 63/412,721, filed on Oct. 3, 2022.

(51) Int. Cl.
    *A21D 2/16*    (2006.01)
    *A21D 2/18*    (2006.01)
    (Continued)

(52) U.S. Cl.
    CPC ............ *A21D 2/165* (2013.01); *A21D 2/183* (2013.01); *A21D 2/261* (2013.01); *A21D 2/262* (2013.01);
    (Continued)

(58) Field of Classification Search
    None
    See application file for complete search history.

(56) References Cited

U.S. PATENT DOCUMENTS

2006/0029713 A1\*  2/2006  Eckert .................... A23L 23/00
                                                        426/581
2007/0148318 A1\*  6/2007  Rubio ..................... A23L 7/117
                                                        426/622
(Continued)

FOREIGN PATENT DOCUMENTS

| CN | 107712900 A | 2/2018 |
| CN | 110839799 A | 2/2020 |
| CN | 114766674 A | 7/2022 |

OTHER PUBLICATIONS

Non-Final Rejection Mailed on Aug. 30, 2023 for U.S. Appl. No. 18/136,476, 9 page(s).
(Continued)

*Primary Examiner* — Lien T Tran
(74) *Attorney, Agent, or Firm* — Workman Nydegger

(57) ABSTRACT

Composite plant-MCT flour includes MCT oil encapsulated by and/or complexed with wall material and incorporated within the composite plant-MCT flour, wherein polysaccharide from the plant flour forms part of the wall material. The wall material includes protein, e.g., pea protein, carbohydrate, and emulsifier(s), and/or polysaccharide fiber, e.g., acacia fiber. The plant flour may be gluten-flour, gluten-free flour and/or low carbohydrate seed, nut or vegetable floor. Composite plant-MCT flour can replace traditional flours to make food products, such as baked, fried or boiled goods but with benefits, such as reduced gluten and/or carbohydrates, increased freshness and volume and improved texture and taste compared to alternative flours and even all-purpose flour.

20 Claims, 4 Drawing Sheets

(51) Int. Cl.
*A21D 2/26* (2006.01)
*A21D 6/00* (2006.01)
*A21D 13/04* (2017.01)
*A21D 13/043* (2017.01)
*A21D 13/045* (2017.01)
*A21D 13/047* (2017.01)
*A21D 13/066* (2017.01)

(52) U.S. Cl.
CPC ............ *A21D 2/263* (2013.01); *A21D 2/265* (2013.01); *A21D 2/266* (2013.01); *A21D 6/003* (2013.01); *A21D 13/04* (2013.01); *A21D 13/043* (2017.01); *A21D 13/045* (2017.01); *A21D 13/047* (2017.01); *A21D 13/066* (2013.01)

(56) References Cited

U.S. PATENT DOCUMENTS

| | | |
|---|---|---|
| 2009/0004333 A1 | 1/2009 | Nakhasi et al. |
| 2010/0119684 A1 | 5/2010 | Santana et al. |
| 2012/0053251 A1 | 3/2012 | Ervin et al. |
| 2016/0058039 A1* | 3/2016 | Sanguansri ............. A23L 7/165 426/89 |
| 2016/0081927 A1 | 3/2016 | Bromley |
| 2020/0060310 A1 | 2/2020 | Schmidt et al. |
| 2020/0107564 A1 | 4/2020 | Barbieri et al. |
| 2021/0037866 A1 | 2/2021 | Zhang |
| 2022/0192238 A1 | 6/2022 | Smith et al. |
| 2023/0106086 A1* | 4/2023 | Reddy .................... A23L 15/35 426/93 |
| 2023/0140841 A9* | 5/2023 | Wagner Salvini ..... A61K 36/33 426/648 |

OTHER PUBLICATIONS

Non-Final Rejection Mailed on Sep. 29, 2023 for U.S. Appl. No. 18/231,023, 11 page(s).
Red Tractor Foods, Coconut & MCT Flour Blend, Jul. 2, 2021.
San et al., "Effects of wall material on medium-chain triglyceride oil microcapsules prepared by spray drying," Pharmaceutics, (2022) pp. 1-10.
Red Tractor Foods, Healthy Baking Coconut & MCT Flour Blend, available online atleast as early as Sep. 2022.
International Search Report and Written Opinion received for PCT Patent Application No. PCT/US2023/075719, mailed on Feb. 7, 2024, 13 pages.
International Search Report and Written Opinion received for PCT Patent Application No. PCT/US23/75711, mailed on Feb. 16, 2024, 13 pages.

* cited by examiner

COMPOSITE PLANT-MCT FLOUR, METHOD OF MANUFACTURE, AND FOOD PRODUCTS MADE THEREFROM

CROSS-REFERENCE TO RELATED APPLICATIONS

This application claims the benefit of U.S. Provisional Application No. 63/412,721, filed Oct. 3, 2022, which is incorporated by reference in its entirety.

BACKGROUND

Wheat flour is a powder made by grinding wheat and used for human consumption. Gluten, the main protein in wheat flour, is a combination of several glutelin proteins, primarily glutenin, and is found in other grains, such as barley and rye, which gives baked goods a characteristic texture, elasticity, and taste. Wheat varieties are called "soft" or "weak" if gluten content is low and "hard" or "strong" if they have high gluten content. Hard flour, or bread flour, is high in gluten, with 12% to 14% gluten content. Its dough has elastic toughness that holds its shape well once baked. Soft flour is comparatively low in gluten and thus results in a loaf with a finer, crumbly texture. In terms of the parts of the grain used in flour—the endosperm or protein/starchy part, the germ or protein/fat/vitamin-rich part, and the bran or fiber part—there are three general types of flour. White flour is made from the endosperm only. Brown flour includes some of the grain's germ and bran, while whole grain or whole meal flour is made from the entire grain, including the bran, endosperm, and germ. Germ flour is made from the endosperm and germ, excluding the bran.

The use of wheat having higher gluten content can cause health problems to many. In addition, it is generally believed that all-purpose white flour is unhealthy because it is very high in carbohydrates that typically have a high glycemic index over 70, low in fat, low in protein, and low in fiber. Often, all-purpose flour is "fortified" to include some vitamins and mineral in an attempt to make the flour "healthier." However, the imbalance in high carbohydrates is not offset by vitamins and minerals and can cause or exacerbate diabetes, obesity, and other health problems caused by nutritionally imbalanced and high glycemic index foods. With regard to gluten, there are mainly two kinds of harm caused by gluten: celiac disease and non-celiac gluten sensitivity (NCGS) or gluten sensitivity.

Celiac disease, sometimes called celiac sprue or gluten-sensitive enteropathy, is an immune reaction to eating gluten, a protein found in wheat, barley and rye. If a person has celiac disease, eating gluten triggers an immune response in the small intestine. Over time, this reaction damages the small intestine lining and prevents it from absorbing some nutrients (malabsorption). Intestinal damage often causes diarrhea, fatigue, weight loss, bloating, and anemia and can lead to serious complications. In children, malabsorption can also affect growth and development. There is no cure for celiac disease but, for most people, following a strict gluten-free diet can help manage symptoms and promote intestinal healing.

NCGS is a gluten-related disorder that is less serious than celiac disease but has similar symptoms and treatment. There remains much debate in the scientific community as to whether or not NCGS is a distinct clinical disorder. The pathogenesis of NCGS is not well understood but involves the activation of the innate immune system by direct cytotoxic effects of gluten and probably other wheat components. There is evidence that gliadin, a class of proteins which makes up about 70% of the protein in gluten and is the main cytotoxic antigen of gluten, may be the cause. Other proteins, such as amylase/trypsin-inhibitors named (ATIs), which are present in gluten-containing cereals (wheat, rye, barley, and their derivatives) in smaller quantities (about 2-4%) may also play a role in the development of symptoms. ATIs are potent activators of the innate immune system.

NCGS is the most common syndrome of gluten-related disorders, with prevalence rates between 0.5%-13% in the general population. As no biomarker for diagnosing this condition is available, its diagnosis is made by exclusion of other gluten-related disorders, such as celiac disease and wheat allergy. Many people have not been diagnosed following strict criteria, and there may be a fad component underlying the recent rise in popularity of gluten-free diets, leading to debate surrounding the evidence for this condition and its relationship to celiac disease and irritable bowel syndrome. People with NCGS are often unrecognized by specialists and may lack adequate medical care and treatment. They often have a long history of health complaints and unsuccessful consultations with physicians and, thus, many resort to a gluten-free diet and a self-diagnosis of gluten sensitivity.

Other problems with gluten include gluten ataxia and wheat allergy. Gluten ataxia is an autoimmune disorder that affects certain nerve tissues and causes problems with muscle control and voluntary muscle movement. Wheat allergy, like other food allergies, is the result of the immune system mistaking gluten or some other protein found in wheat as a disease-causing agent, such as a virus or bacterium. The immune system creates an antibody to the protein, prompting an immune system response that may result in congestion, breathing difficulties, brain damage, neurological problems affecting motor skills, and other symptoms.

To address gluten-related diseases or allergies, many have turned to gluten-free alternatives to wheat flour, such as gluten-free grain flours including oat flour, or corn flour, non-grain flours such as almond flour, coconut flour, and flour blends that contain other substances, such as vegetable proteins in addition to flour. Commercially available gluten-free flours are typically made with different mixtures, which vary widely from brand to brand. They may contain rice flour, teff flour, tapioca flour, sorghum flour, potato starch, garbanzo flour, or buckwheat flour. These flours may also contain nut meals, made from very finely ground almonds or other nuts. Some of these "flours" are also low in carbohydrates.

There are several problems with alternative flours compared to all-purpose white flour, which include not working properly with existing recipes, poor taste, poor flowability, and poor quality of finished baked goods or other food products. This makes those products not only unappealing and more of a "have to eat" instead of a "want to eat" product, making them expensive and non-commercially viable for the general population at large.

Non-grain flours, like coconut flour, are made by grinding dried coconut meat. During manufacture, coconuts are first cracked open and drained of liquid. The coconut meat is then scraped out, rinsed, grated, and strained to separate the solids from the milk. The solids are then baked at a low temperature until dry before being ground into flour. The resulting white powder looks and feels similar to flour made from grains, such as wheat. Its flavor is mild. Compared with wheat flour, coconut flour is higher in fiber, protein, and certain vitamins and minerals, such as potassium and iron. However, coconut flour suffers the same fate as gluten-free flour in not working properly with existing recipes, poor taste, poor flowability, and poor quality of finished baked products or other food products, making them expensive and non-commercially viable for the general population at large.

In an attempt to make healthier flours, flours may be "blended" and include different components. An example of a "blended flour" is coconut flour blended with medium chain triglycerides (MCT) powder, a healthy oil. Because MCTs are liquid at room temperature, they must be processed to form a powder in order to be blended with other powders such as flour. In order to change liquid MCTs into solid powder form, manufacturers mix the oil with a carrier substance (usually a starch), then spray-dry the mixture into a powder form. Carrier powders used in the spray drying process are often low-quality starches that are cheap and easy to work with. MCT powders generally contain 50-80% MCTs and 20-50% starchy powder. This can be a problem for people trying to limit carbohydrates, which can raise insulin levels and cause food sensitivities. A blended flour is generally an attempt to make the resulting flour healthier. However, MCT oil often causes gastrointestinal (GI) distress when taken in even minor doses. In the case of MCT powder blended into regular wheat flour, gluten-free flour, or non-grain flour, blending does not solve the problem of GI distress often associated with the ingestion of MCT. Another problem is the tendency of coconut-MCT blended flour to separate during the mixing process, which then yields incorrect consistencies in baking, resulting in inferior quality baked products.

A major problem with gluten-free flours is their tendency to create poor-tasting and structurally unsound products. Wheat flour and other gluten-containing grain flours typically taste better and yield more durable baked products that hold together using most baked-good recipes already formed around the use of wheat flour. To create products able to bake properly and hold together like gluten-containing flour, gluten-free products may contain substantial quantities of gums, such as carrageenan, which can also cause gastrointestinal GI problems. Gums are naturally derived food additives and include compounds such as carrageenan, xanthan gum, guar gum, and gum Arabic. They are used liberally in gluten-free baking as texture enhancers to replace the superior elastic properties typically provided by gluten. Their ability to thicken and stabilize doughs helps improve the consistency and moisture of notoriously dense and crumbly gluten-free goods. Indeed, food gums are found almost universally in commercial gluten-free baked goods, such as breads, cookies, cakes, and muffins.

Unfortunately, many gums are also fermentable in the gut and may contribute to gas and bloating in susceptible individuals, particularly when intake is high. To be clear, food gums are not considered harmful or unhealthy, and consuming fermentable carbohydrates such as those represented by gums may be healthy for their prebiotic effects. But for people more sensitive to pain associated with intestinal gas, and digestive issues, high intake of food gums may not be tolerable.

Accordingly, there is a long-felt but unsatisfied need to find ways to make wheat and other gluten flours naturally healthier as well as develop healthy alternative flours for baking that can take the place of wheat flour without having to change typical recipes and/or create poor tasting and/or structurally unsound and/or expensive baked products. There is also a long-felt but unsatisfied need to find unique and beneficial ways to deliver effective doses of MCT to a subject without causing GI upset or distress.

SUMMARY

Disclosed herein are composite plant-MCT flours having improved nutritional and performance profiles compared to traditional flours and methods of making composite plant-MCT flours. Such composite plant-MCT flours can be used for baking and cooking like traditional flours but with several benefits. These include reducing or eliminating gluten, reducing carbohydrates, and incorporating healthy, energy rich effective doses of medium chain triglycerides (MCTs) into the diet, as MCTs are quickly and easily metabolized into energy as a preferred energy alternative to sugar without raising insulin or glucose levels and without causing GI distress.

There are three general categories of composite plant-MCT flours disclosed herein: classic wheat or other gluten-containing plant-MCT flour with reduced gluten and carbohydrates, gluten-free plant-MCT flour with no gluten and reduced carbohydrate, and low carbohydrate plant-MCT flour with no gluten and significantly reduced carbohydrates. These categories are not necessarily mutually exclusive but emphasize different aspects. All three categories advantageously contain energy rich, complexed MCT oil. Classic composite plant-MCT flours are made from wheat or other gluten-containing flour. Gluten-free composite plant-MCT flours replace wheat or other gluten-containing flour with plant-based flour made from grains, seeds, nuts, or roots that do not contain gluten. Low carbohydrate composite plant-MCT flours are typically made from seed or nut flours that have naturally low carbohydrate content compared to classic flours and gluten-free flours that have higher carbohydrate content. Each of these flours provides a different and distinct macronutrient profile in which different health characteristics can be identified when used.

Because MCT is an oil and typically a liquid at room temperature, the composite plant-MCT flours incorporate micro- and/or nano-sized MCT oil droplets or particles encapsulated by and/or complexed with a protein- and/or polysaccharide-based wall structure to form complexed MCT oil. "MCT oil" includes one or more of C6-C12 triglycerides. In preferred embodiments, the MCT comprises one or more of C8 (caprylic acid) triglyceride, C10 (capric acid) triglyceride, mixture of C8 and C10 triglycerides, or C8 and C10 mixed triglyceride. In preferred embodiments, the wall structure of complexed MCT oil comprises protein (e.g., pea protein), polysaccharide (e.g., starch) from the plant flour (e.g., gluten flour, gluten-free flour, or low carbohydrate flour), emulsifier (e.g., gum Arabic), and optional co-emulsifier (e.g., calcium and/or sodium stearoyl lactylate). In other embodiments, polysaccharide fiber (e.g., acacia fiber) can be used in addition to or in place of the protein to form the wall structure of complexed MCT incorporated within composite plant-MCT flours. The complexed MCT oil may optionally contain one or more supplemental oils (e.g., that contain unsaturated fatty acids, long-chain fatty acids, and/or short-chain fatty acids), which supplement and/or replace a portion of the MCT oil.

Forming complexed MCT within composite plant-MCT flour creates the powdered nature of MCT and maintains the stability and freshness of the complexed MCT oil and composite plant-MCT flour containing complexed MCT oil. Depending on the ratio of wall material to MCT oil, there may be an excess of wall material such that a portion of the wall material may form empty micelles, vesicles, or assembled complexes that do not contain and/or are not complexed with MCT oil. In some cases, "empty" micelles include a water droplet instead of MCT oil. In other cases, assembled complexes may include only wall material. Including an excess of wall material ensures that all or substantially all of the MCT oil is encapsulated by and/or complexed with wall material.

The composite plant-MCT flours typically comprise clusters comprised of micro- and/or nanosized particles containing complexed MCT oil, modified and/or unmodified plant flour particles, and excess wall material, such as nanomicelles, nanovesicles, uncombined protein, and/or uncombined emulsifier, which may form clusters with themselves, complexed MCT oil, or modified and/or unmodified plant flour particles. In a preferred embodiment, a portion of the wall material used to form the complexed MCT oil is provided by plant flour particles, which release starch or other polysaccharide during formation. The release of polysaccharide from plant flour yields modified plant flour particles that include protein but are depleted in polysaccharide. In some embodiments, encapsulated MCT oil droplets or particles form MCT cores, and the wall structure forms shells that at least partially encapsulate the MCT cores.

The various components that make up the composite plant-MCT flour may be considered to involve a physical and/or chemical transformation compared to "blended" native plant flour mixed with traditional forms of MCT oil. Such transformations yield composite plant-MCT flours that store well, flow well, mix well, have increased nutrition, and higher product quality (e.g., improved quality of baked goods). They can also yield food products of higher volume (i.e., for a given weight or volume of composite plant-MCT flour used to replace traditional flour counterparts in recipes).

The composite plant-MCT flours disclosed herein are markedly different and perform substantially better than blended MCT flour, which is a simple dry blend of native plant (e.g., coconut) flour and typical MCT powder (e.g., MCT oil spray-dried with polysaccharide). Conventional MCT powders typically contain up to 50% polysaccharide. Thus, dry blending MCT powder with native plant flour significantly increases polysaccharide content and reduces protein content of the blended flour. Dry blending MCT powder with native flour does not alter the properties of either the MCT powder or the flour: both behave like they would in the absence of the other). Nor does directly applying MCT oil to native plant flour alter either the MCT oil or the plant flour (i.e., there is no chemical and/or physical change, as occurs when making composite plant-MCT flours as disclosed herein).

For example, consuming MCT oil in either oil form or powder form commonly causes GI problems, such as stomach upset and/or diarrhea. In contrast, the composite plant-MCT flours disclosed herein alter the way the body absorbs MCT oil and reduce or eliminate GI problems commonly associated with taking an effective dose of MCT oil. In addition, some of the starch or other polysaccharide from the plant flour can be incorporated into the wall material that encapsulates and/or is complexed with the MCT oil, which improves the properties and performance of the composite plant-MCT flour.

An example method of manufacturing composite plant-MCT flour comprises: (1) forming a wall material slurry comprised of water, native plant flour containing protein and polysaccharide, secondary protein, and emulsifier(s); (2) combining MCT oil, and optionally a supplemental oil (one or more or unsaturated fatty acids, long-chain fatty acids, or short-chain fatty acids) with the wall material slurry to form a heterogeneous mixture; (3) subjecting the heterogeneous mixture to high speed shearing to form an emulsion; (4) subjecting the emulsion to high pressure nanolization to form micro- and/or nano-sized composite droplets; and (5) spray-drying the nanolized composite droplets with heated air to remove water by evaporation and form dried composite plant-MCT flour particles. In some embodiments, acacia fiber can be used in place of the secondary protein as wall material.

The use of high-speed shearing to form the emulsion causes at least some of the native flour particles to release polysaccharide (e.g., starch), which results in a physical and/or chemical transformation of native plant flour to form modified plant flour particles. The polysaccharides released from the native plant flour combine with the secondary protein (or acacia fiber, for example) and emulsifier, which can be a polysaccharide, to form a new type of composite wall material. This composite wall material can be used to encapsulate and/or form a complex with MCT oil (and optional supplemental oil) to form a new type of composite flour particles having advantageous properties not found in traditional flours or blended MCT flours. The composite plant-MCT flours disclosed herein include composite flour particles that have been physically and/or chemically transformed relative to native plant flour and MCT oil starting materials.

In some embodiments, dried composite flour particles made by the preceding process can be the final composite plant-MCT flour product. In other embodiments, the dried composite flour particles can be mixed and sieved to produce a refined composite plant-MCT flour product with more uniform particle size. The larger particles removed by sieving can be reground and added back to the refined composite plant-MCT flour product, used as a coarser composite plant-MCT flour product for making food products, and/or recycled back to the wall material slurry and/or heterogeneous mixture used to form the nano emulsion in the process above.

In some embodiments, the composite plant-MCT flour can be blended with one or more other materials to form a blended flour product. For example, a first composite plant-MCT flour made using a first native flour can be blended with a second composite plant-MCT flour made using a different native flour. Alternatively, a composite plant-MCT flour or plant-MCT flour mixture can be blended with one or more native flours to form a blended flour product having desired nutrition and/or performance properties.

The composite plant-MCT flours disclosed herein can replace and/or supplement traditional flours to make food products, such as baked goods, fried goods, boiled goods, and non-cooked goods, including but not limited to, breads, biscuits, rolls, buns, cakes, cupcakes, pies, bagels, muffins, flatbread, cakes, brownies, pastries, cookies, crackers, tarts, puff pastries, donuts, tarts, turnovers, crepes, pancakes, waffles, crumpets, cornbread, muffuletta, breaded meats, dumplings, pasta, noodles, tortellini, ravioli, ice cream, yogurt, and the like.

In some cases, the composite plant-MCT flours disclosed herein can increase the volume of products made compared to traditional flours (e.g., all-purpose white flour). The volume increase can be 5%, 10%, 15%, 20%, 25%, 30%, 35%, 40%, 45% or 50% compared to an equivalent quantity of all-purpose white flour (on a volume and/or weight basis). The result is a greater quantity (volume) of food product made using the same quantity of composite plant-MCT flour and/or a reduced quantity of composite plant-MCT flour to make a given quantity of food product.

Food products made using the composite plant-MCT flours are reportedly more moist, fluffier, lighter in taste, and sometimes sweeter, even when less sweetener is used, than food products made using traditional flour. The composite plant-MCT flour may allow for a reduction in the amount of oil and/or sugar that would otherwise be required to yield a product of desired taste and quality. Such reduction can yield lower calorie food products. Food products made using composite plant-MCT flours disclosed herein have been found to stay fresher longer, e.g., before becoming stale, developing mold, becoming rancid, and the like. The protein- and/or polysaccharide-complexed MCT oil in the flour reduces or eliminates GI tract issues. The composite plant-MCT flours reduce glycemic spikes because they have lower carbohydrate load, higher protein content, higher fat content, and increased digestive time of the polysaccharides because of their unique role in forming the wall material. Composite plant-MCT flours may contain one or more optional supplemental oils (e.g., that contain unsaturated fats), which can provide a source of omega-3 and omega-6 polyunsaturated fatty acids, which are essential fatty acids that provide health benefits when not consumed in excess and provided in the correct ratio.

Additional features and advantages will be set forth in part in the description that follows, and in part will be obvious from the description, or may be learned by practice of the embodiments disclosed herein. It is to be understood that both the foregoing brief summary and the following detailed description are exemplary and explanatory only and are not restrictive of the embodiments disclosed herein or as claimed.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION

Introduction

Figure 1:
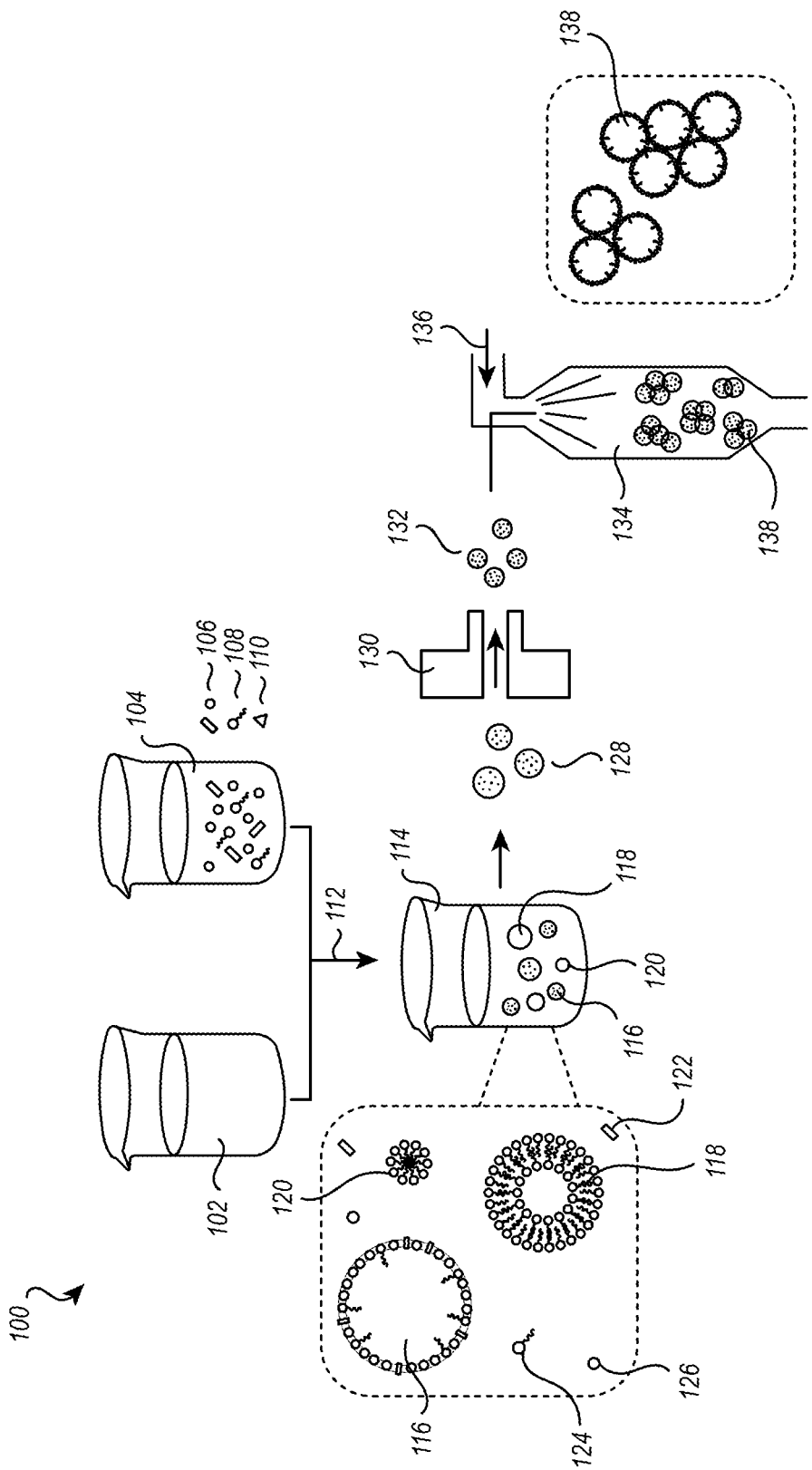
FIG. 1 schematically depicts steps that can be used in the formation of composite plant-MCT flours.

Composite plant-MCT flours disclosed herein have improved nutritional and performance profiles compared to traditional plant and blended flours. Composite plant-MCT flours incorporate complexed MCT oil, which comprise MCT droplets or particles encapsulated by and/or complexed with a wall structure comprised of protein and/or polysaccharide, emulsifier, and optionally co-emulsifier.

Three general categories of composite plant-MCT flours disclosed herein include classic wheat or other gluten-containing plant-MCT flour with reduced gluten and carbohydrates, gluten-free plant-MCT flour, and low carbohydrate plant-MCT flour. Classic composite plant-MCT flours are made from wheat or other gluten-containing flour. Gluten-free composite plant-MCT flours replace wheat or other gluten-containing flour with plant-based flour made from grains, seeds, nuts, or roots that do not contain gluten. Low carbohydrate composite plant-MCT flours are typically made from seed or nut flours that have naturally low carbohydrate content compared to classic flours and gluten-free flours that have higher carbohydrate content.

The composite plant-MCT flours disclosed herein perform substantially better than blended MCT flours, which are simple dry blends of native plant (e.g., coconut) flour and traditional MCT powder (e.g., MCT oil spray-dried with polysaccharide). Dry blending MCT powder with native flour does not alter the properties of either the MCT powder or the flour: both behave like they would in the absence of the other. Nor does directly applying MCT oil to native plant flour alter either the MCT oil or the plant flour (i.e., there is no chemical and/or physical change, as occurs when making the composite plant-MCT flours disclosed herein).

Consuming MCT oil in either oil form or powder form commonly causes GI upset and/or diarrhea. In contrast, the disclosed composite plant-MCT flours alter the way the body absorbs MCT and reduces or eliminates GI problems commonly associated with MCT consumption. Encapsulating and/or complexing MCT oil with wall material comprising protein and carbohydrate beneficially balances fat, protein and carbohydrates, aiding in better digestibility. Composite plant-MCT flour may optionally contain one or more supplemental oils (e.g., that contain unsaturated fatty acids, long-chain fatty acids, and/or short-chain fatty acids), which supplement and/or replace a portion of the MCT oil. One or more nutrition oils, when included, can provide a source of omega-3 and omega-6 polyunsaturated fatty acids, which are essential fatty acids that provide health benefits when not consumed in excess and provided in the correct ratio. Long-chain fatty acids provide a source of fat. Short-chain fatty acids can improve gut health.

In addition, incorporating starch or other polysaccharide from the plant flour into the wall material that encapsulates and/or is complexed with MCT oil improves nutrition and other properties and performance of the composite plant-MCT flour.

Composite Plant-MCT Flours

There are three general categories of composite plant-MCT flours: classic wheat or other gluten-containing plant-MCT flour with reduced gluten and carbohydrate, gluten-free plant-MCT flour, and low carbohydrate plant-MCT flour. These categories are not necessarily mutually exclusive but emphasize different aspects. Classic composite plant-MCT flours are made from wheat or other gluten-containing flour. Gluten-free composite plant-MCT flours replace wheat or other gluten-containing flour with plant-based flour made from grains, seeds, nuts, or roots that do not contain gluten. Low carbohydrate composite plant-MCT flours can be made using seed or nut flours that have naturally low carbohydrate content compared to classic flours and gluten-free flours that have high carbohydrate content. Each of these flours provides a different and distinct macronutrient profile in which different health characteristics can be identified when used.

Composite plant-MCT flours disclosed herein comprise protein- and/or polysaccharide-complexed MCT oil and plant flour particles homogeneously blended with the complexed MCT oil. At least a portion of the plant flour particles are depleted in polysaccharide and are therefore modified plant flour particles. The protein- and/or polysaccharide-complexed MCT oil comprises MCT droplets or particles encapsulated by and/or complexed with a wall material comprising protein and/or polysaccharide fiber (e.g., acacia fiber), polysaccharide from the plant flour, emulsifier, and optional co-emulsifier. In preferred embodiments, starch or other polysaccharide released from the plant flour particles advantageously forms a portion of the wall structure and makes it more durable. In some embodiments, MCT droplets or particles form MCT cores and protein- and/or polysaccharide-based wall structure forms shells that at least partially encapsulate the MCT cores.

Plant Flours

Classic wheat or other gluten-containing composite plant-MCT flours comprise plant flour particles that include and/or are derived from one or more gluten flours, such as one or more of wheat flour, barley flour, rye flour, spelt flour, graham flour, or triticale flour. In some embodiments, composite plant-MCT flours have reduced gluten and carbohydrates per unit and are more nutritionally balanced compared to corresponding plant flour(s). It has been found that composite plant-MCT flours made from wheat flour can be used in place of different types of flour such as all-purpose flour, bread flour, or cake flour without sacrificing performance, and in some cases improving performance, compared to the corresponding plant flour.

Wheat flour can be sub-classified based on gluten content, intended use, and optionally other criteria. Examples include all-purpose flour (bleached or unbleached), bread flour (bleached or unbleached), cake flour (bleached or unbleached), pastry flour (bleached or unbleached), self-rising flour (bleached or unbleached), instant flour, and "00" flour. Whole wheat flour can be bleached or unbleached.

Example gluten-free flours include, but are not limited to, oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, and quinoa flour.

Example gluten-free and low carbohydrate seed, nut, or vegetable flours, include, but are not limited to, coconut flour, almond flour, peanut flour, sesame flour, sunflower seed flower, hazelnut flour, walnut flour, soy flour, chickpea flour, flaxseed (linseed) flour, fava bean flour, pumpkin seed flour, lupine flour, red lentil flour, and white bran flour.

Example wheat flours include white flour, all-purpose flour, and whole wheat flour. Wheat flour is available in many varieties. Categorization can be regional, and the same name may have several different regional meanings. In the United States, for example, flours are typically categorized by gluten/protein content, processing, and use.

"All-purpose flour" (also known as "plain flour") is a blended wheat flour with a protein content lower than bread flour, ranging from 9% to 12%. Depending on brand or the region where it is purchased, all-purpose flour may be composed of hard or soft wheats, but is typically a blend of both, and can range from low to moderately high protein content. All-purpose flour is marketed as an inexpensive alternative to bakers' flour and is acceptable for most baking needs.

"Bread flour" or "strong flour" is made from hard wheat, usually hard spring wheat. It has a relatively high protein content, between 10% and 13%, making it excellent for yeast bread baking. It can be white or whole wheat or in between.

"Cake flour" is a finely milled white flour made from soft wheat. It has relatively low protein content, between 8% and 10%, making it suitable for soft-textured cakes and cookies. The higher protein content of other flours would make the cakes tough. Related to cake flour are masa harina (from maize), maida flour (from wheat or tapioca), and pure starches.

"Durum flour" is made from Durum wheat and is suited for pasta making, traditional pizza, and flatbread for doner kebab.

"Graham flour" is a special type of whole wheat flour. The endosperm is finely ground, as in white flour, while the bran and germ are coarsely ground. Graham flour is uncommon outside of the United States (except for see atta flour, a similar product). Graham flour is the basis of true graham crackers.

"Instant flour" is pregelatinized (precooked) for easier incorporation in gravies and sauces.

"Pastry flour" or "cookie flour" or "cracker flour" has slightly higher protein content than cake flour but lower than all-purpose flour. Its protein content ranges from 9% to 10%. It is available as a white flour, a whole-wheat flour, or a white flour with the germ retained but not the bran. Pastry flour is suitable for pie pastry and tarts, some cookies, muffins, biscuits and other quick breads. Flour is typically passed through a sieve to reduce the amount of lumps for cooking pastry.

"Whole-wheat flour" contains the wheat germ, endosperm, and bran.

"White flour" or "refined flour" contains only the endosperm.

"Whole-wheat white flour" is white flour that contains the endososperm, bran, and germ.

"Enriched flour" is white flour with nutrients added to compensate for the removal of the bran and germ.

"Bleached flour" is a white flour treated with flour bleaching agents to whiten it (freshly milled flour is yellowish) and give it more gluten-producing potential. Oxidizing agents are usually employed, most commonly organic peroxides such as acetone peroxide or benzoyl peroxide, nitrogen dioxide, or chlorine. A similar effect can be achieved by permitting the flour to oxidize with oxygen in the air ("natural aging") for approximately 10 days. However, this process is more expensive due to the time required.

"Bromated flour" has a maturing agent added. The agent's role is to help with developing gluten, a role similar to flour bleaching agents. Bromate is often used. Other choices are phosphates, ascorbic acid, and malted barley.

"Self-rising" or "self-raising flour" is white flour that is sold premixed with chemical leavening agents.

"Spelt flour" is produced from a type of wheat called "spelt". It is less commonly used in modern cooking than other wheat varieties but is used for specialty baking.

In Canada, "whole wheat flour" may have up to 5% of the grain removed, e.g., most of the germ is often removed to prevent the flour from going rancid. "Whole grain flour" contains the whole grain, including bran, germ and endosperm, but not the chaff.

"Sharp flour" is produced in Fiji and primarily used in Indian cuisine.

In India, flours are generally categorized by how much of the grain is stripped away. "Wheat powder/flour" and "whole grain" flour are a mixture of germ, endosperm, and bran. "Atta flour" is a mixture of endosperm and bran. "Maida flour" is bleached endosperm, and a very white flour similar to the American bleached flour. "Sooji/rava" is coarse-ground endosperm.

"Tang flour" or wheat starch is a type of wheat flour used primarily in Chinese cuisine for making the outer layer of dumplings and buns. It is also used in Vietnamese cuisine, where it is called bot loc trong.

Protein- and/or Polysaccharide Complexed MCT Oil

The protein- and/or polysaccharide-complexed MCT oil within composite plant-MCT flours disclosed herein comprise MCT droplets or particles encapsulated by and/or complexed with a wall structure. The MCT droplets or particles contained within complexed MCT oil comprise one or more of C6 triglyceride, C8 triglyceride, C10 triglyceride, C12 triglyceride, or mixed triglyceride thereof. In preferred embodiments, MCT droplets or particles comprise one or more of C8 triglyceride, C10 triglyceride, or C8/C10 mixed triglyceride. The complexed MCT oil may optionally contain one or more supplemental oils (e.g., that contain unsaturated fatty acids, long-chain fatty acids, and/or short-chain fatty acids), which supplement and/or replace a portion of the MCT oil. Unsaturated fatty acids can provide a source of omega-3 and omega-6 polyunsaturated fatty acids, which are essential fatty acids that provide health benefits when not consumed in excess and provided in the correct ratio. Long-chain fatty acids provide a source of fat. Short-chain fatty acids can improve gut health.

Example supplemental oils that can be included in addition to and/or that replace a portion of the MCT oil, include but are not limited to avocado oil, Brazil nut oil, canola oil, corn oil, cottonseed oil, flaxseed oil, grape see oil, hemp seed oil, olive oil, palm oil, peanut oil, rice bran oil, safflower oil (e.g., high oleic), sesame oil, soybean oil, walnut oil, hazelnut oil, sunflower oil, and butterfat. Some are considered to be more nutritional than others, and more nutritionally sound oils are preferred. Nevertheless, when used in relatively small amounts, even oils considered to be less nutritional can provide a source of essential omega-3 and omega-6 polyunsaturated fatty acids when consumed in minor quantities and that provide a healthy ratio of polyunsaturated fats. Butterfat can provide a source of healthy butyric acid.

Protein- and/or polysaccharide-complexed MCT oil can have a particle size less than about 10 µm, or less than about 5 µm, or less than about 1 µm, or less than about 500 nm, or less than about 250 nm, or less than about 100 nm.

Proteins and Polysaccharides

The protein and/or polysaccharide used to make the wall material and wall structure of complexed MCT oil may be considered to be "secondary protein" and "secondary polysaccharide", with the plant flour providing the "primary protein" for the composite plant-MCT flours disclosed herein and the "primary polysaccharide" forming the wall structure.

Example proteins used to make wall material to encapsulate and/or complex MCT oil can be plant protein or animal protein. Example plant proteins include, but are not limited to, one or more of pea protein, hemp protein, pumpkin seed protein, rice protein, soy protein, sunflower seed protein, sacha inchi (*Plukenetia volubilis*) protein, chia protein, and quinoa protein. Example animal proteins include, but are not limited to, one or more of whey protein, casein, egg protein, beef protein, chicken protein, fish protein, and collagen. In currently preferred embodiments, the protein comprises one or more plant proteins, more preferably pea protein.

Example secondary polysaccharides include, but are not limited to, acacia fiber, starch, pectin, cellulose derivatives, inulin, xylan, arabinoxylan, and chitin. Example starches include, but are not limited to, corn starch, potato starch, wheat starch, rice starch, and cassava starch. A preferred secondary polysaccharide used in addition to or in place of the secondary protein, e.g., pea protein, is acacia fiber.

Pea protein is a common source of plant food protein and can be derived and extracted from yellow and green split peas, *Pisum sativum*. It can be used as a dietary supplement to increase an individual's protein or other nutrient intake, or as a substitute for other food products. As a powder, it can used as an ingredient in food manufacturing, such as a thickener, foaming agent, or emulsifier.

Pea protein can be extracted in powder form and processed and produced in different ways. It can be an isolate through wet fractionation, which produces a high protein concentration. It can be a concentrate through the process of dry fractionation, which produces a low protein concentration. It can be in textured form, which is when it is used in food products as a substitute for other products, such as meat alternatives Pea protein is a food source due to its availability, low allergenicity, and high nutritional value.

Pea protein is rich in nutrients such as protein and carbohydrates, contains vitamins and minerals, and is low in fat. Peas typically contain 23.1-30.9% protein, 1.5-2.0% fat, and minor constituents such as vitamins, phytic acid, saponins, polyphenols, minerals, and oxalates. They also contain several classes of protein: globulin, albumin, prolamin, and glutelin. The proteins are mainly albumins and globulins, which account for 10-20% and 70-80% of the protein in the pea seed, respectively. The albumins are water soluble and considered to be metabolic and enzymatic proteins, while the globulins are salt soluble and act as the storage proteins for the seed. Globulins can be further classified into legumin and vicilin. Legumin is a hexameric protein, and vicilin proteins are trimers.

Pea seeds contain 60-65% carbohydrates, mainly composed of oligosaccharides, monosaccharides, polysaccharides, and disaccharides. The major carbohydrate fraction in peas is starch, which is the major storage carbohydrate in the cotyledons. Peas also contain high levels of dietary fiber, which consists of cellulose, gums, hemicellulose, pectin, mucilage, lignin, and resistant starches. Dry peas have 17-27% dietary fiber depending on cultivar, environment, and global growing region. Pea seeds also contain 5-6% sucrose and raffinose. Sucrose ranges from 2.2% to 2.6%, stachyose ranges from 1.3-3.2%, verbascose ranges from 1.2-4.0%, and raffinose ranges from 0.2-1.0% depending on cultivar and environment.

The fat content of pea seeds ranges from 1.2% to 1.8% depending on cultivar. About 25% of fatty acids are composed of oleic acid and 50% of linoleic acid. Pea seeds are also a rich source of minerals and vitamins, such as folic acid, riboflavin, pyridoxine, and niacin.

Emulsifiers and Co-Emulsifiers

The emulsifier used to make the wall material for forming the wall structure used to make complexed MCT oil can be one or more of gum Arabic, acacia fiber, xanthan gum, guar gum, gellan gum, carrageenan, locust bean gum, pectin, starch, soy lecithin, egg lecithin, agar-agar, dextrin, monoglycerides, or diglycerides. In currently preferred embodiments, the emulsifier comprises gum Arabic.

The optional co-emulsifier used to make the wall material for forming the complexed MCT oil can be one or more of calcium stearoyl lactylate, sodium stearoyl lactylate, cetearyl alcohol, cetyl alcohol, calcium stearate, magnesium stearate, phosphates, polyglycerol esters, polysorbate, sorbitan monostearate, or sucrose fatty acid ester. In currently preferred embodiments, the co-emulsifier comprises calcium stearoyl lactylate and/or sodium stearoyl lactylate.

Method of Manufacturing Composite Plant-MCT Flour

An example method of manufacturing composite plant-MCT flour comprises:
  forming a wall material slurry comprised of water, plant flour particles, protein or acacia fiber, emulsifier, and optional co-emulsifier;
  combining MCT oil, and optionally a supplemental oil, with the wall material slurry to form a heterogeneous mixture;
  subjecting the heterogeneous mixture to high speed shearing to form an emulsion comprised of MCT droplets or particles at least partially encapsulated by and/or complexed with wall material;
  subjecting the emulsion to high pressure nanolization to form micro- and/or nano-sized composite droplets; and
  spray-drying the nanolized composite droplets with heated air to remove water by evaporation and form dried composite plant-MCT flour particles,
  wherein the dried composite plant-MCT flour particles comprise complexed MCT droplets or particles encapsulated by and/or complexed with a wall structure comprised of the protein or acacia fiber, polysaccharide from the plant flour particles, emulsifier, and optional co-emulsifier The use of high-speed shearing to form the initial emulsion causes at least some of the native flour particles to release polysaccharide (e.g., starch), which results in a physical and/or chemical transformation of the native flour to form modified plant flour. The polysaccharides released from the native flour combine with the secondary protein (or acacia fiber) and emulsifier, which can be a polysaccharide, to form a new type of composite wall material. This composite wall material can be used to encapsulate and/or form a complex with MCT oil to form a new type of composite flour particles having advantageous properties not found in traditional flours or blended MCT flour. The composite plant-MCT flours disclosed herein include composite flour particles that have been physically and/or chemically transformed relative to native plant flour and MCT starting materials.

Properties of Composite Plant-MCT Flours

Forming dried complexed MCT oil maintains the stability, freshness, and powdered nature of the complexed MCT oil and composite plant-MCT flour that incorporates the complexed MCT oil. Depending on the ratio of wall material to MCT oil, there may be an excess of wall material such that a portion of the wall material may form empty micelles, vesicles, or assembled complexes that do not contain and/or are not complexed with MCT oil. In some cases, "empty" micelles include a water droplet instead of MCT oil. In other cases, assembled complexes may include only wall material. Including an excess of wall material ensures that all or substantially all of the MCT oil is encapsulated by and/or complexed with wall material.

The composite plant-MCT flours typically comprise clusters comprised of micro- and/or nanosized complexed MCT oil, modified and/or unmodified plant flour particles, and excess wall material, such as nanomicelles, nanovesicles, uncombined protein, and/or uncombined emulsifier, which may form clusters with themselves, complexed MCT oil, or modified and/or unmodified plant flour particles. In a preferred embodiment, a portion of the wall material used to form the complexed MCT oil is provided by plant flour particles, which release starch or other polysaccharide during formation. The release of polysaccharide from plant flour yields modified plant flour particles that include protein but are depleted in polysaccharide.

The various components that make up the composite plant-MCT flour may be considered to involve a physical and/or chemical transformation compared to native plant flour and traditional forms of MCT oil. Such transformations yield composite plant-MCT flours that store well, mix well, have increased nutrition, and higher product quality (e.g., improved quality of baked goods). They can also yield food products of higher volume (i.e., for a given weight or volume of MCT flour used to replace traditional wheat flour).

The composite plant-MCT flours of the disclosure are markedly different than and perform substantially better than blended MCT flour, which is a simple dry blend of native plant (e.g., coconut) flour and traditional MCT powder (e.g., MCT oil spray-dried with a polysaccharide). MCT powder typically contains up to 50% polysaccharide. Thus, dry blending MCT powder with native plant flour significantly increases polysaccharide content and reduces protein content of the blended flour. The composite plant-MCT flours of the disclosure are also different in composition and structure compared to a hypothetical flour made by directly applying MCT oil to native flour particles. Blended MCT flours tend to create GI distress due to the MCT contained in the MCT powder within the blended flour.

Systems and Methods for Manufacturing Composite Plant-MCT Flour

FIG. 1 illustrates an example system 100 for manufacturing composite plant-MCT flours. System 100 includes a container or hopper 102 with MCT oil and a container, hopper or mixer 104 with water, secondary protein particles 106, emulsifier (and optional co-emulsifier) 108, and plant flour 110.

A high-speed shearing mixer 112 is used to form an emulsion 114. The emulsion 114, preferably a nano-emulsion, comprises various components, including encapsulated MCT droplets or particles 116, nanovesicles 118 having a double layer structure with a hydrophilic shell surface and aqueous phase inside containing water, nanomicelles 120 having a hydrophilic outer surface and hydrophobic core, excess protein particles 122, excess emulsifier (and optional co-emulsifier) particles 124, and flour fragments 126.

A high pressure nanolizer device or system 130 processes emulsion droplets 128 to form MCT flour nanocapsules 132, which are sent to a spray-drying apparatus or system 134. Heated air 136 dries the nanocapsules 132 and forms dried clusters 138 that make up the composite plant-MCT flour.

Figure 2:
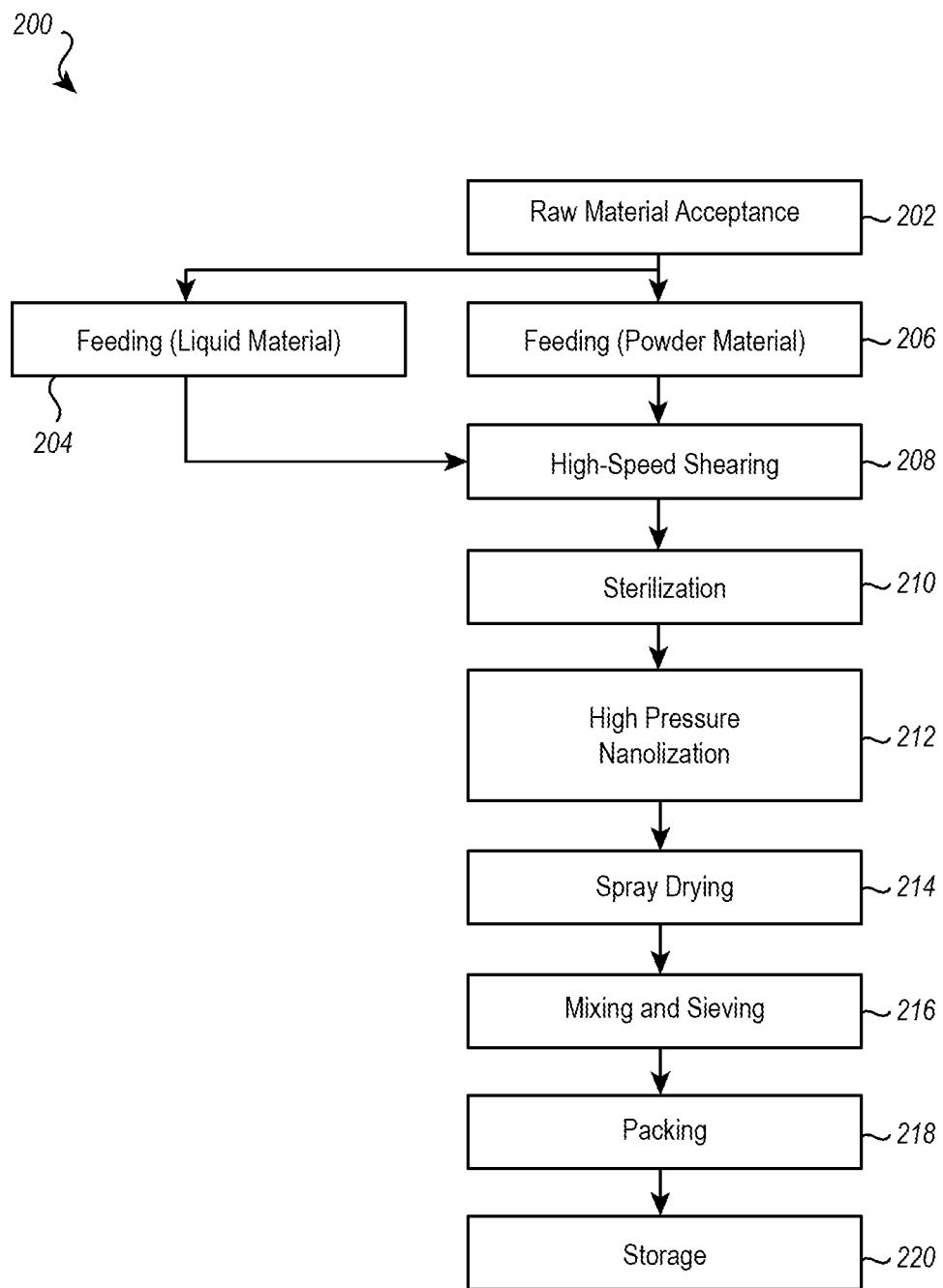
FIG. 2 is a flow chart that illustrates an example method of manufacturing composite plant-MCT flours.

FIG. 2 is a flow chart that illustrates an example method 200 of manufacturing composite plant-MCT flour. In raw material acceptance step 202, the ingredients are weighed according to an established or desired formula. When making composite plant-MCT flour, one of the major component materials is the plant flour.

In first feeding step 206, protein, emulsifiers, co-emulsifiers, and plant flour are dispersed into water to form a wall material aqueous slurry. In a second feeding step 204, liquid MCT oil, and optionally a supplemental oil, is added to the wall material aqueous solution to form a heterogeneous mixture.

In high-speed shearing step 208, the heterogeneous mixture is mixed evenly by high-speed shearing to form an initial nano-emulsion, which is mainly comprised of complexed plant-MCT flour microcapsules, nano-micelles and nanovesicles formed by emulsifiers and co-emulsifiers, free plant protein and emulsifier nanoparticles, modified flour particles in which at least a portion of starch or other polysaccharide is released, and optionally unmodified flour particles. The complexed plant-MCT flour microcapsules comprise MCT droplets or particles at least partially encapsulated by and/or complexed with wall material.

In some embodiments, protein nanoparticles and emulsifiers/co-emulsifiers are assembled at the oil/water interface, with starch acting as a polymer to fill crevices in the wall material or structure, thus forming complete outer shells to embed MCT oil droplets or particles, thereby forming complexed plant-MCT flour microcapsules.

In sterilization step 210, the initial nano-emulsion is sterilized, such as at a temperature of about 90° C. to about 100° C., such as for about 25 to about 35 seconds, to remove or kill essentially all microorganisms.

In high pressure nanolization step 212, the initial nano-emulsion is homogenized under a pressure of about 40 MPa to about 100 MPa. The high mechanical pressure generated by high pressure disperses the mixture of complexed plant-MCT flour microcapsules, nanomicelles, and nanovesicles into homogeneous complexed plant-MCT flour nanocapsules.

In spray-drying step 214, the nanoemulsion of complexed plant-MCT flour nanocapsules is converted into complexed plant-MCT flour nanocapsule clusters. The inlet air temperature is maintained at about 160° C. to about 220° C., and the outlet air temperature is maintained at about 75° C. to about 100° C.

In mixing-sieving step 216, the intermediate product is mixed in a blender and then sieved to obtain complexed plant-MCT flour with relatively uniform particle size.

In packing step 218, the complexed plant-MCT flour is packed into aluminum foil bag using a packaging machine known to those skilled in the art.

In storage step 220, complexed plant-MCT flour is stored in a cool, ventilated, and dry environment. To maintain cleanliness, the storage warehouse should be equipped with an electronic rodent proof device, fly extinguisher, and other pest control facilities.

Use of Composite Plant-MCT Flours

In some embodiments, dried composite plant-MCT flour particles made by processes disclosed herein, but before sieving, can be the final composite plant-MCT flour product. In other embodiments, the dried composite flour particles can be mixed and sieved to produce a refined composite plant-MCT flour product with more uniform particle size. The larger particles removed by sieving can be reground and added back to the refined composite plant-MCT flour product, used as a coarser composite plant-MCT flour product for making food products, and/or recycled back to the wall material slurry and/or heterogeneous mixture used to form the initial emulsion in the process above.

In some embodiments, the composite plant-MCT flour can be blended with one or more other materials to form a composite plant-MCT blended flour product. For example, a first composite plant-MCT flour made using a first native flour can be blended with a second composite plant-MCT flour made using a different native flour. Alternatively, a composite plant-MCT flour or plant-MCT flour mixture can be blended with one or more native flours to form a blended flour product having desired nutrition and/or performance properties.

The composite plant-MCT flours disclosed herein can replace and/or supplement traditional flours to make food products, such as baked goods, fried goods, boiled goods, and non-cooked goods, including but not limited to, breads, biscuits, rolls, buns, cakes, cupcakes, pies, bagels, muffins, flatbread, cakes, brownies, pastries, cookies, crackers, tarts, puff pastries, donuts, tarts, turnovers, crepes, pancakes, waffles, crumpets, cornbread, muffuletta, breaded meats, dumplings, pasta, noodles, tortellini, ravioli, ice cream, yogurt, and the like.

In some cases, the composite plant-MCT flours disclosed herein can increase the volume of products made compared to traditional flours (e.g., all-purpose white flour). The composite plant-MCT flours were typically found to yield products having 25% greater volume, when using the amount of flour specified in recipes, compared to all-purpose white flour or other traditional flour. The volume increase can be at least 5%, 10%, 15%, 20%, 25%, 30%, 35%, 40%, 45% or 50% compared to an equivalent quantity of traditional flour (on a volume and/or weight basis). The result is a greater quantity (volume) of food product made using the same quantity of plant-MCT flour and/or a reduced quantity of plant-MCT flour to make a given quantity of food product.

The reason for this surprising and unexpected increase in volume is believed to be the way in which the composite plant-MCT flours are manufactured. In one aspect, MCT droplets or particles are encapsulated and/or complexed with a protein-based wall structure that includes protein, polysaccharide released from the plant flour particles, emulsifier (typically a polysaccharide), and co-emulsifier. The complexed MCT oil provides homogeneously dispersed packets of fat, protein, polysaccharide, and co-emulsifier that contribute to formation of an extended and easily expandable network of protein and polysaccharide chains that coordinate with water during the mixing and cooking process.

In addition, the manufacturing process, including the high-shear mixing of heterogenous mixture to form the emulsion, partially breaks down at least some of the flour particles, releasing starch or other polysaccharide into the mixture, which contributes to the extended and expandable network of protein and polysaccharide chains that coordinate with water during the mixing and cooking process. In contrast, fluor particles that have not been processed by such high shear mixing remain intact and do not release and distribute starch or other polysaccharide into the mixture. As evidence of this, bread must be vigorously kneaded to release and develop the elastic gluten protein. Absent input of energy required to break down the flour particles, their volume producing capability remains smaller.

Another explanation is that the network structure (texture) formed by pea or other secondary protein, dextrin or other polysaccharide, and flour is different from that of native flour. Compared with native flour, the network structure in composite plant-MCT flour is highly elastic but with lower rebound tension compared to the elasticity from gluten protein in ordinary gluten flour, which has higher rebound tension and cannot expand as much during rising and/or baking. During the baking process, the volume of bread made using ordinary flour rises to a certain extent and is pulled/prevented by the elastic network structure with strong rebound tension, while composite plant-MCT flour can rise to a larger volume due to the lower rebound tension of the dough structure.

Another explanation is that the fat content of composite plant-MCT flour is significantly higher than that of ordinary flour. In the process of raising or kneading dough, the oil and emulsifier in the composite plant-MCT flour form a membrane in the dough, which provides the dough with better gas barrier properties to a certain extent. Gas (air and steam) generated inside the dough during baking cannot easily escape from the dough, thus forming many small air or steam compartments, which causes the dough to increase in volume like a balloon.

Food products made using the composite plant-MCT flours are reportedly more moist, fluffier, lighter in taste, and sometimes sweeter, even when less sweetener is used, than food products made using traditional flour. The composite plant-MCT flour may allow for a reduction in the amount of oil and/or sugar that would otherwise be required to yield a product of desired taste and quality. Such reduction can yield lower calorie food products. Food products made using composite plant-MCT flours disclosed herein have been found to stay fresher longer, e.g., before becoming stale, developing mold, becoming rancid, and the like. The complexed MCT oil in the flour reduces or eliminates GI tract issues caused by conventional uses of MCT oil or MCT powder. The composite plant-MCT flours reduces glycemic spikes because they have lower carbohydrate load, higher protein content, and higher fat content and increase the digestive slowness of the carbohydrates.

EXAMPLES

The examples describe exemplary composite plant-MCT flours that can be used in place of traditional flours for making baked goods and other food products.

Example 1

Composite wheat-MCT flour with reduced gluten and carbohydrate includes MCT droplets or particles encapsulated by and/or complexed with a wall structure. The wall structure comprises wall material formed from pea protein (secondary protein source and emulsifier), starch from the wheat flour, calcium stearoyl lactylate (co-emulsifier), and sodium stearoyl lactylate (co-emulsifier). The materials are added in the following amounts:

| All-purpose wheat flour | 85-90 wt % |
| MCT Oil (C8 and/or C10 triglycerides) | 5-10 wt % |
| Pea Protein | 3-5 wt % |
| Calcium Stearoyl Lactylate | 0.1-1.5 wt % |
| Sodium Stearoyl Lactylate | 0.1-1.5 wt % |

The composite wheat-MCT flour is made by (i) initially forming a wall material slurry comprising 50 wt % water and 50 wt % wall material composed of all-purpose wheat flour, pea protein, calcium stearoyl lactylate, and sodium stearoyl lactylate, (ii) high shear mixing of the MCT oil with the wall material slurry to form an emulsion comprised of microencapsulated MCT oil droplets surrounded by wall material micelles and modified wheat flour particles from which a portion of the starch has been released to form a portion of the wall material, (iii) and nanolizing and spray drying to form composite wheat-MCT flour particles, which can form complexes. The composite wheat-MCT flour particles are sieved to remove larger particles, which can be recycled back to the wall material slurry and/or material used to form the emulsion.

The composite wheat-MCT flour can be used as a substitute for all-purpose wheat flour or blended all-purpose wheat and MCT flour but with a better nutritional profile (e.g., by including secondary protein) and reduced or no GI tract problems compared to MCT powder. The composite wheat-MCT flour can be used in place of traditional all-purpose wheat flour or blended MCT flour to make baked goods, fried goods, boiled goods, and non-cooked goods, including but not limited to, breads, biscuits, rolls, buns, cakes, cupcakes, pies, bagels, muffins, flatbread, cakes, brownies, pastries, cookies, crackers, tarts, puff pastries, donuts, tarts, turnovers, crepes, pancakes, waffles, crumpets, cornbread, muffuletta, breaded meats, dumplings, pasta, noodles, tortellini, ravioli, ice cream, yogurt, and the like In some cases, the composite wheat-MCT flour can be included in the amount specified in the recipe, and the total volume of food product is increased by up to 25%. In other cases, the composite wheat-MCT flour can be included in reduced amounts in order for the yield to be as specified in the recipes.

Example 2

Composite wheat-MCT flour with reduced gluten and carbohydrate includes MCT droplets or particles encapsulated by and/or complexed with a wall structure. The wall structure comprises wall material formed from pea protein (secondary protein source), starch from the wheat flour, gum Arabic (emulsifier), calcium stearoyl lactylate (co-emulsifier), and sodium stearoyl lactylate (co-emulsifier). The materials are added in the following amounts:

| All-purpose wheat flour | 85-90 wt % |
| MCT Oil (C8 and/or C10 triglycerides) | 5-10 wt % |
| Pea Protein | 3-5 wt % |
| Gum Arabic | 1-3 wt % |
| Calcium Stearoyl Lactylate | 0-1.5 wt % |
| Sodium Stearoyl Lactylate | 0-1.5 wt % |

The composite wheat-MCT flour is made by (i) initially forming a wall material slurry comprising 50 wt % water and 50 wt % wall material composed of all-purpose wheat flour, pea protein, gum Arabic, and calcium stearoyl lactylate and/or sodium stearoyl lactylate, (ii) high shear mixing of the MCT oil with the wall material slurry to form an emulsion comprising microencapsulated MCT oil droplets surrounded by wall material micelles and modified wheat flour particles from which a portion of the starch has been released to form a portion of the wall material, (iii) and nanolizing and spray drying to form composite wheat-MCT flour particles, which can form complexes. The composite wheat-MCT flour particles are sieved to remove larger particles, which can be recycled back to the wall material slurry and/or material used to form the emulsion. The composite wheat-MCT flour is used as in Example 1.

Example 3

Composite wheat-MCT flour was made by the following process:
1. Raw material acceptance: the ingredients were weighed according to the formula: plant protein nanoparticles (0.5%~10%), emulsifiers/co-emulsifiers (0.5%~5%), and flour (75%~95), and were dispersed into water to form wall material slurry;
2. High-speed shearing: MCT oil (3%~12%) was added into the wall material slurry; all the materials were mixed evenly by high-speed shearing to form the initial nanoemulsion, which was mainly composed of microcapsules (consisting of MCT oil drops as core material, starch, pea protein and emulsifiers as wall materials), nanomicelles and/or nanovesicles and free components (such as plant protein nanoparticles, emulsifiers/co-emulsifiers, and free flour); emulsifiers/co-emulsifiers were amphiphilic molecules, which self-assembled in water to form nanomicelles and/or nanovesicles in order to reduce interfacial tension; specifically, nanomicelles had a hydrophilic outer surface and hydrophobic core; nanovesicles had double layer structure with hydrophilic shell surface and aqueous phase inside; plant protein nanoparticles as Pickering particles and emulsifier/co-emulsifier were assembled at the oil/water interface; at the same time, a small amount of starch released from the wheat flour acted as polymer to fill gaps in the shell, thus forming complete outer shells to embed MCT oil, and composite plant-MCT microcapsules were obtained;
3. High pressure nanolization: after high pressure homogenization, nanomicelles and nanovesicles were converted into relatively homogeneous composite plant-MCT nanocapsules; the composite plant-MCT nanocapsules and remaining free flour, free protein, and free emulsifiers formed a composite plant-MCT slurry;
4. Spray drying: the composite plant-MCT slurry was converted into powder clusters with micron particle size; the clusters were comprised of MCT oil droplets or particles embedded in microcapsules formed from protein, emulsifiers, polysaccharides from the wheat flour, and flour particles associated with the microcapsules; the composite plant-MCT flour was a homogeneous powder rather than a mixture of relatively independent individual ingredients.

The composite wheat-MCT flour particles were sieved to remove larger particles, which can be recycled back to the wall material slurry and/or material used to form the emulsion. The composite wheat-MCT flour can be used as in Example 1.

Example 4

Examples 1-3 are modified by replacing at least a portion of the pea protein and/or gum Arabic with acacia fiber. The composite wheat-MCT flour produces similar food products but with slightly altered nutritional profile.

Example 5

Examples 1-4 are modified by replacing at least a portion of the pea protein with at least one plant protein selected from hemp protein, pumpkin seed protein, rice protein, soy protein, sunflower seed protein, sacha inchi (*Plukenetia volubilis*) protein, chia protein, or quinoa protein.

Example 6

Examples 1-5 are modified by replacing at least a portion of plant protein with at least one animal protein selected from whey protein, casein, egg protein, beef protein, chicken protein, fish protein, or collagen.

Example 7

Composite plant-MCT flour is made by replacing at least a portion of the all-purpose wheat flour in Examples 1-6 with one or more gluten flours selected from barley flour, rye flour, spelt flour, graham flour, or triticale flour.

Example 8

Reduced gluten composite plant-MCT flour is made by replacing 5-50% of the gluten flour in Examples 1-7 with one or more gluten-free flours selected from oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, or quinoa flour.

Example 9

Gluten-free composite plant-MCT flour is made by replacing the gluten flour in Examples 1-7 with one or more gluten-free flours selected from oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, or quinoa flour.

Example 10

Reduced gluten and reduced carbohydrate composite plant-MCT flour is made by replacing 5-50% of the gluten flour in Examples 1-7 with one or more gluten-free and low carbohydrate flours selected from coconut flour, almond flour, peanut flour, sesame flour, sunflower seed flower, hazelnut flour, walnut flour, soy flour, chickpea flour, flaxseed (linseed) flour, fava bean flour, pumpkin seed flour, lupine flour, red lentil flour, or white bran flour.

Example 11

Gluten-free and low carbohydrate composite plant-MCT flour is made by replacing the flour in Examples 1-10 with one or more gluten-free and low carbohydrate flours selected from coconut flour, almond flour, peanut flour, sesame flour, sunflower seed flower, hazelnut flour, walnut flour, soy flour, chickpea flour, flaxseed (linseed) flour, fava bean flour, pumpkin seed flour, lupine flour, red lentil flour, or white bran flour.

Example 12

The composite plant-MCT flour of any of Examples 1-11 is modified by including one or more supplemental oils in addition to and/or that replace a portion of the MCT oil, including one or more of avocado oil, Brazil nut oil, canola oil, corn oil, cottonseed oil, flaxseed oil, grape see oil, hemp seed oil, olive oil, palm oil, peanut oil, rice bran oil, safflower oil (e.g., high oleic), sesame oil, soybean oil, walnut oil, hazelnut oil, sunflower oil, or butterfat.

Example 13

A mixed composite plant-MCT flour is made by blending a composite plant-MCT flour of any of Examples 1-12 with any other composite plant-MCT flour(s) of Examples 1-12.

Example 14

A blended composite plant-MCT flour is made by blending a composite plant-MCT flour of any of Examples 1-13 with one or more native plant flours.

Example 15

Cupcakes were made from cupcake batter comprising the following ingredients:

| Composite Wheat-MCT flour | 33.5% |
|---|---|
| Soybean Oil | 3.1% |
| Egg | 35.4% |
| Sugar | 12.4% |
| Skim Lactose-Free Milk | 13.7% |
| Baking Powder | 1.9% |

The cupcakes were made in a cupcake baking pan containing wells into which the cupcake batter was placed and baked at ordinary temperature and time in an oven according to the recipe. The cupcakes were comparable or superior in quality and taste compared to cupcakes made using traditional all-purpose or cake flour and had superior nutrition profile.

Example 16

Bread was made from bread dough comprising the following ingredients:

| Composite Wheat-MCT flour | 48.6% |
|---|---|
| Sugar | 9.7% |
| Yeast | 0.2% |
| Bread amendment | 0.5% |
| Milk powder | 2.9% |
| Egg | 11.7% |
| Salt | 0.2% |
| Butter | 4.8% |
| Water | 21.4% |

Bread loaves were made by kneading the bread dough as usual, letting it rise, beating the raised dough down, placing the dough into baking pans, allowing the dough to rise a second time, and baked at ordinary temperature and time in an oven according to the recipe. The bread was comparable or superior in quality and taste compared to bread made using traditional all-purpose or bread flour and had superior nutrition profile.

Example 17

Biscuits were made from biscuit dough comprising the following ingredients:

| Composite Wheat-MCT flour | 44.7% |
|---|---|
| Butter | 24.6% |

-continued

| Salt | 0.5% |
|---|---|
| Sugar | 10.1% |
| Non-Dairy Cream | 13.7% |
| Baking Powder | 1.9% |

The biscuits were made on a flat baking sheet onto which pieces of biscuit dough were placed and baked at ordinary temperature and time in an oven according to the recipe. The biscuits were comparable or superior in quality and taste compared to biscuits made using traditional all-purpose or cake flour and had superior nutrition profile.

Example 18

Thin pancakes were made from thin pancake batter comprising the following ingredients:

| Composite Wheat-MCT flour | 57.2% |
|---|---|
| Water | 42.7% |
| Salt | 0.1% |

The thin pancakes were made in a frying pan into which batter was placed and cooked at ordinary temperature and time according to the recipe. The thin pancakes were comparable or superior in quality and taste compared to thin pancakes made using traditional all-purpose or cake flour and had superior nutrition profile.

Example 19

Muffins were made from muffin dough comprising the following ingredients:

| Composite Wheat-MCT flour | 1-3/4 cups |
|---|---|
| Sugar | 1/3 cup |
| Egg | 1 |
| Milk | 3/4 cup |
| Cooking Oil | 3/4 cup |
| Baking Powder | 2 teaspoons |
| Salt | 1/4 teaspoon |

The muffins were made in a muffin baking pan containing wells into which muffin dough in muffin cups were placed and baked at ordinary temperature and time in an oven according to the recipe. The muffins were comparable or superior in quality and taste compared to muffins made using traditional all-purpose or cake flour and have superior nutrition profile. The muffins were lighter, fluffier and more moist compared to conventional muffins made using all-purpose flour instead of the composite wheat-MCT flour.

Example 20

Coffee cake was made from cake batter comprising the following ingredients:

| Composite Wheat-MCT flour | 2 cups |
|---|---|
| Erythritol | 1-1/2 cups |
| Baking Powder | 2 teaspoons |
| Salt | 1/2 teaspoon |
| Cold Butter | 1/2 cup |
| Eggs, whites whipped separately | 3 eggs |

-continued

| | |
|---|---|
| Cream mixed with water, as needed | ¾ cup |
| Vanilla Extract | 1-½ teaspoons |
| Hazelnut Extract | 1-½ teaspoons |

The coffee cake was made in a glass cake pan into which the cake batter was placed and baked at ordinary temperature and time in an oven according to the recipe. The coffee cake was comparable or superior in quality and taste compared to coffee cake made using traditional all-purpose or cake flour and had superior nutritional profile. The coffee cake was lighter, fluffier, and more moist compared to conventional coffee cake made using all-purpose flour instead of the composite wheat-MCT flour.

Example 21

Banana nut bread was made from cake batter comprising the following ingredients:

| | |
|---|---|
| Composite Wheat-MCT flour | 1 cup |
| Erythritol | 1-¾ cups |
| Vanilla | 1 teaspoon |
| Eggs (beaten) | 3 eggs |
| Ripe bananas, 3 smashed | about 1 cup |
| Milk | ¾ cup |
| Salt | ½ teaspoon |
| Baking Soda | ½ teaspoon |
| Chopped Pecans | ½-1 cup |

The banana nut bread was made in a greased metal bread pan into which the cake batter was placed and baked at ordinary temperature and time in an oven according to the recipe. The banana nut bread was comparable or superior in quality and taste compared to banana nut bread made using traditional all-purpose or cake flour and had superior nutritional profile. The banana nut bread was lighter, fluffier and more moist compared to conventional banana nut bread made using all-purpose flour instead of the composite wheat-MCT flour.

Example 22

Pasta was made from pasta dough comprising the following ingredients:

| | |
|---|---|
| Composite Wheat-MCT flour (plus more for rolling out the noodles) | 1 cup |
| Fine Sea Salt | ½ teaspoon |
| Egg | 1 large |

The pasta dough was mixed, kneaded and pressed through a pasta maker according to the recipe and formed into individual pasta noodles. The pasta noodles were placed into boiling water and cooked according to the recipe until soft and tender but not sticky. The pasta was comparable or superior in quality and taste compared to pasta made using traditional all-purpose or cake flour and had superior nutritional profile. The pasta had superior texture compared to conventional pasta made using all-purpose flour instead of the composite wheat-MCT flour.

Comparative Example 23

Conventional blended MCT flour is used instead of the composite plant-MCT flours in Examples 1-22. The food products have inferior quality and nutrition profile, with higher carbohydrates and less protein, and they cause GI tract issues, particularly with increasing amounts of MCT powder.

Comparative Gastrointestinal Tolerance Study

A gastrointestinal tolerance study was conducted by having test subjects eat cakes made from four different flours and then comparing the outcomes. Consumption of MCT oil can cause gastrointestinal (GI) distress. Acceptable intakes of MCT need to be determined. The purpose of this study was to determine the GI tolerance of baking products made using composite wheat-MCT flours with different MCT contents compared to all-purpose wheat flour or blended wheat-MCT flour. It was a randomized, double-blind, placebo-controlled design with parallel groups.

Small soy-based cakes of four different varieties were made using equivalent amounts of the following four flours mixed with soy milk and baked using conventional means:

| Fluor Type | MCT Content Per Cake |
|---|---|
| All-Purpose Cake (APC) Flour | 0 g |
| Blended APC Flour and MCT Powder | 10 g |
| Composite APC-MCT (7%) Flour | 7 g |
| Composite APC-MCT (10%) Flour | 10 g |

The subjects were divided into four groups in a random order and changed their diets every two days. The total study period was six days. The subjects consumed the test diet and completed a GI tolerance questionnaire. At day 7, the subjects were required to record their satisfaction with GI comfort over the past one week.

A GI tolerance questionnaire was used to record the occurrence and severity of eight GI domains including bloating, nausea, flatulence, GI cramping, diarrhea, constipation, abdominal pain, and GI rumbling. GI domains were scored with a 4-point scale (0=none, 1=mild, 2=moderate, 3=severe). These domains were chosen based on published articles of GI tolerance. For simplicity, a composite GI tolerance score was produced by averaging the different scores from the eight GI domains.

Figure 3:
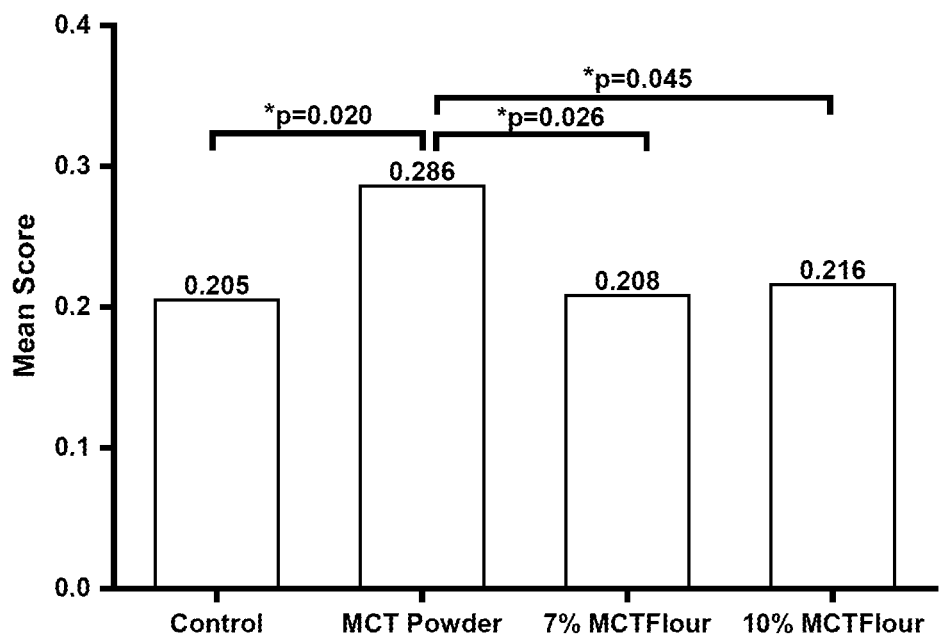
FIG. 3 is a graph from a comparative test that compared gastrointestinal tolerance of baked cake products made using all-purpose flour only, a blended flour composed of all-purpose flour and MCT powder, and two composite plant-MCT flours having different amounts of complexed MCT oil incorporated therein.

The results of the GI tolerance study are set forth in Table 1 and depicted graphically in FIG. 3. The "control" is all-purpose wheat flour.

TABLE 1

| | APC Flour (Control) | Blended APC Flour and MCT Powder | Composite APC-MCT (7%) Flour | Composite APC-MCT (10%) Flour |
|---|---|---|---|---|
| Score 0 | 371 | 341 | 352 | 362 |
| Score 1 | 62 | 73 | 58 | 64 |
| Score 2 | 15 | 24 | 12 | 11 |
| Score 3 | 0 | 2 | 2 | 3 |
| Total # of Scores | 448 | 440 | 424 | 440 |

The mean score is the average of all symptom scores in each group all-purpose cake flour (Control), blended all-purpose cake and MCT flour, composite all-purpose cake-MCT (7%) flour, and composite all-purpose cake-MCT (10%) flour. The mean score reflects the occurrence and severity of GI distress, with the subjects evaluating their GI symptoms on the 4-point scale (0=none, 1=mild, 2=moderate, 3=severe). The number of subjects were counted for each score in each group (Table 1), and calculated mean score for each participant in the groups.

FIG. 3 graphically illustrates the mean score for each test group. The mean test scores for participants in each test group were added together and then divided by the total number of subjects for each group to calculate the mean score of each test group. The mean score for each group reflects the overall occurrence and severity of GI distress in the various groups. The higher the mean score, the more frequent and severe the GI distress.

Subjects who consumed cakes made using all-purpose cake flour had a mean score of 0.205, which was the control mean score.

Subjects who consumed cakes made using blended all-purpose cake flour and MCT powder showed the greatest mean score (0.286), which is significantly higher than the other groups (p<0.05). This indicates that consuming cakes made using MCT powder caused obvious GI distress.

Subjects who consumed cakes made using composite all-purpose cake-MCT (7%) flour and composite all-purpose cake-MCT (10%) flour had mean scores of 0.208 and 0.216, respectively, which are close to the control group mean scope of 0.205. This indicates that the composite all-purpose cake-MCT flours were generally well tolerated.

Comparative Volume Study

A volume study was conducted by making cakes of various sizes using all-purpose flour as the control and a composite plant-MCT flour. The composite plant-MCT flour contained 10% encapsulated MCT oil made according to Example 3, using C8 triglyceride as MCT oil, all-purpose flour as flour component, pea protein as encapsulation protein, gum Arabic as emulsifier, and calcium and sodium stearoyl lactate as co-emulsifier.

The cake batters for the comparative volume study were made according to the following recipe in Table 2:

TABLE 2

| Ingredient | Percentage |
| --- | --- |
| Flour | 33.5% |
| Soybean oil | 3.1% |
| Egg | 35.4% |
| Sugar | 12.4% |
| Skim lactose-free milk | 13.7% |
| Baking Powder | 1.9% |

There were two types of batter: one that used all-purpose flour and another that used the composite plant-MCT flour. Each type of cake batter was loaded into metal cake pans in the following weights: 50 g, 100 g, 200 g, and 300 g. For each of the 50 g, 100 g, and 200 g cakes, two batches were made for each type of cake batter; for the 300 g cakes, sixty batches were made for each type of cake batter.

The cakes were baked in an oven for 30 minutes at a top heat temperature of 170° C. (338° F.) and a bottom heat temperature of 180° C. (356° F.). The comparative volume data for the smaller cakes (50 g, 100 g, and 200 g) are set forth in Table 3:

TABLE 3

| | Number | 50 g | 100 g | 200 g |
| --- | --- | --- | --- | --- |
| All-Purpose Flour (vol. in cm³) | 1 | 102 | 281 | 324 |
| | 2 | 99 | 287 | 320 |
| Composite Plant-MCT Flour (vol. in cm³) | 1 | 126 | 376 | 450 |
| | 2 | 124 | 379 | 447 |

The data clearly show that the volumes of the cakes made using composite plant-MCT flour were much higher than the cakes made using all-purpose flour. Averaging the two batches together, the increase in volume for cakes made using composite plant-MCT flour in amounts of 50 g, 100 g and 200 g were 24%, 33% and 39% greater, respectively, than the corresponding cakes made using all-purpose flour. Unexpectedly, the volume increase was incrementally greater as the cake size was increased. This may have been due to a decrease in the exposed surface-to-volume ratio as the weights were increased.

The comparative volume data for the sixty 300 g cakes for each type of cake batter is set forth in Table 4:

TABLE 4

| Number | All-Purpose Flour (vol. in cm³) | Composite Plant-MCT Flour (vol. in cm³) |
| --- | --- | --- |
| 1 | 428 | 600 |
| 2 | 420 | 601 |
| 3 | 434 | 602 |
| 4 | 419 | 604 |
| 5 | 428 | 599 |
| 6 | 430 | 598 |
| 7 | 425 | 604 |
| 8 | 441 | 608 |
| 9 | 420 | 601 |
| 10 | 430 | 597 |
| 11 | 432 | 596 |
| 12 | 418 | 602 |
| 13 | 425 | 600 |
| 14 | 424 | 606 |
| 15 | 419 | 593 |
| 16 | 427 | 601 |
| 17 | 421 | 603 |
| 18 | 421 | 600 |
| 19 | 426 | 600 |
| 20 | 420 | 597 |
| 21 | 425 | 599 |
| 22 | 424 | 598 |
| 23 | 430 | 604 |
| 24 | 432 | 602 |
| 25 | 434 | 600 |
| 26 | 419 | 606 |
| 27 | 428 | 593 |
| 28 | 430 | 604 |
| 29 | 425 | 599 |
| 30 | 427 | 598 |
| 31 | 421 | 604 |
| 32 | 421 | 602 |
| 33 | 426 | 604 |
| 34 | 425 | 599 |
| 35 | 441 | 598 |
| 36 | 420 | 604 |
| 37 | 422 | 606 |
| 38 | 422 | 600 |
| 39 | 423 | 593 |
| 40 | 418 | 598 |
| 41 | 424 | 604 |
| 42 | 419 | 602 |
| 43 | 428 | 600 |
| 44 | 430 | 606 |
| 45 | 425 | 593 |
| 46 | 427 | 604 |
| 47 | 432 | 598 |
| 48 | 434 | 604 |
| 49 | 419 | 602 |
| 50 | 428 | 600 |

TABLE 4-continued

| Number | All-Purpose Flour (vol. in cm³) | Composite Plant-MCT Flour (vol. in cm³) |
|---|---|---|
| 51 | 430 | 606 |
| 52 | 430 | 602 |
| 53 | 432 | 604 |
| 54 | 434 | 599 |
| 55 | 419 | 597 |
| 56 | 428 | 597 |
| 57 | 430 | 599 |
| 58 | 425 | 598 |
| 59 | 419 | 604 |
| 60 | 420 | 606 |

The data again clearly show that the volumes of the cakes made using composite plant-MCT flour were substantially higher than the cakes made using all-purpose flour. Averaging the sixty batches together, the increase in volume for the 300 g cakes made using composite plant-MCT flour was 41% greater than the 300 g cakes made using all-purpose flour. Unexpectedly, the volume increase was even higher (41%) than the increase for the 200 g cakes (39%).

Figure 4:
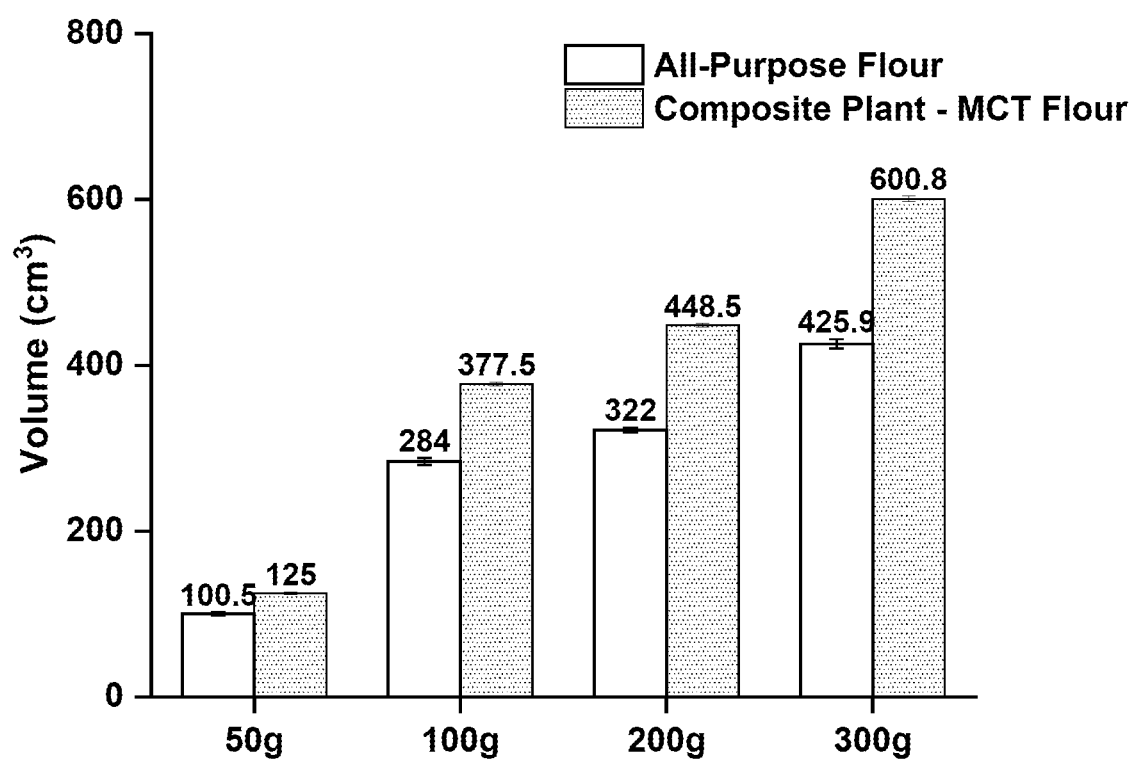
FIG. 4 is a graph from a comparative volume test that compared volumes of various size cakes made using all-purpose flour (control) and composite plant-MCT flour.

FIG. 4 is a graph that compares the volumes of cakes made using either composite plant-MCT flour or all-purpose flour at the various weights. The graph shows that average cake volume was higher for cakes made using composite plant-MCT flour than cakes made using all-purpose flour.

Not only did the cakes made using composite plant-MCT flour have significantly higher volume than the correspondingly weighted cakes made using all-purpose flour, an analysis of the data set forth in Tables 3 and 4 also shows that cakes made using composite plant-MCT flour had more consistent volume than the correspondingly weighted cakes made using all-purpose flour. This is shown in Table 5:

TABLE 5

|  | 50 g | 100 g | 200 g | 300 g |
|---|---|---|---|---|
| All-Purpose Flour (vol. in cm³) | 100.5 ± 2.1 | 284.0 ± 4.2 | 322.0 ± 2.8 | 425.9 ± 5.5 |
| Composite Plant-MCT Flour (vol. in cm³) | 125.0 ± 1.4 | 377.5 ± 2.1 | 448.5 ± 2.1 | 600.8 ± 3.6 |
| Volume Growth Rate | 24% | 33% | 39% | 41% |

For the 50 g cakes, those made using composite plant-MCT flour had a weight that only deviated ±1.4 cm³ from the average of 125.0 cm³. In contrast, the 50 g cakes made using all-purpose flour deviated ±2.1 cm³ from the average of 100.5 cm³. For the largest size cakes (300 g), the decrease in size deviation for cakes made using composite plant-MCT flour compared to cakes made using all-purpose flour is even more impressive considering the 41% greater average size, which yields a percent deviation that is even smaller (0.6% deviation for cakes made using composite plant-MCT flour versus 1.3% deviation for cakes made using all-purpose flour).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of manufacturing a composite plant-MCT flour, comprising:
forming a wall material slurry comprised of water, plant flour, at least one of added protein or polysaccharide fiber, and at least one of an emulsifier or co-emulsifier;
combining MCT oil, and optionally a supplemental oil, with the wall material slurry to form a heterogeneous mixture;
subjecting the heterogeneous mixture to shearing to form an emulsion comprised of MCT oil droplets at least partially encapsulated by the wall material, wherein shearing of the heterogeneous mixture causes release of polysaccharide from the plant flour to form modified plant flour depleted in polysaccharide, wherein at least some of the polysaccharide from the plant flour is incorporated into the wall material;
forming the emulsion into micro-sized and/or nano-sized composite micelles comprising wall material that at least partially encapsulates the MCT oil droplets; and
spray-drying the composite micelles with heated air to remove water by evaporation and form dried composite plant-MCT flour particles,
wherein the dried composite plant-MCT flour particles comprise MCT oil droplets encapsulated by a dried wall structure comprised of at least one of the protein or polysaccharide fiber, polysaccharide released from the plant flour, and at least one of the emulsifier or co-emulsifier.

2. The method of claim 1, further comprising sieving the composite plant-MCT flour to remove larger composite plant-MCT flour particles to produce a sieved composite plant-MCT flour having a more uniform particle size.

3. The method of claim 2, further comprising regrinding the removed larger composite plant-MCT flour particles.

4. The method of claim 3, further comprising adding the reground composite plant-MCT flour particles to the sieved composite plant-MCT flour.

5. The method of claim 2, further comprising using the removed larger composite plant-MCT flour particles as a coarser flour to make a food product.

6. The method of claim 2, further comprising recycling the removed larger composite plant-MCT flour particles back to the wall material slurry and/or heterogeneous mixture.

7. The method of claim 1, wherein the plant flour comprises or is derived from one or more gluten flours selected from the group consisting of wheat flour, barley flour, rye flour, spelt flour, and triticale flour, wherein the composite plant-MCT flour has reduced gluten and carbohydrates per unit compared to the one or more gluten flours alone.

8. The method of claim 1, wherein the plant flour comprises or is derived from one or more gluten-free flours selected from the group consisting of oat flour, corn flour, white rice flour, buckwheat flour, sorghum flour, amaranth flour, teff flour, arrowroot flour, brown rice flour, chickpea flour, tapioca flour, cassava flour, tigernut flour, soy flour, potato flour, millet flour, and quinoa flour.

9. The method of claim 1, wherein the plant flour comprises or is derived from one or more gluten-free and low carbohydrate seed, nut, or vegetable flours selected from the group consisting of coconut flour, almond flour, peanut flour, sesame flour, sunflower seed flower, hazelnut flour, walnut flour, soy flour, chickpea flour, flaxseed flour, and fava bean flour.

10. The method of claim 1, wherein the protein comprises one or more of pea protein, hemp protein, pumpkin seed protein, rice protein, soy protein, sunflower seed protein, sacha inchi protein, chia protein, quinoa protein, whey protein, casein, egg protein, beef protein, chicken protein, fish protein, or collagen.

11. The method of claim 1, wherein the emulsifier is included and comprises one or more of gum Arabic, acacia fiber, xanthan gum, guar gum, gellan gum, carrageenan, locust bean gum, pectin, starch, soy lecithin, egg lecithin, agar-agar, dextrin, monoglyceride, or diglyceride.

12. The method of claim 1, wherein the co-emulsifier is included and comprises one or more of calcium stearoyl lactylate, sodium stearoyl lactylate, cetearyl alcohol, cetyl alcohol, calcium stearate, magnesium stearate, phosphates, polyglycerol esters, polysorbate, sorbitan monostearate, or sucrose fatty acid ester.

13. The method of claim 1, wherein the MCT oil droplets form MCT oil cores and the wall structure forms shells that at least partially encapsulate the MCT oil cores.

14. The method of claim 1, wherein the MCT oil comprises one or more of C8 triglyceride, C10 triglyceride, or C8/C10 mixed triglyceride.

15. The method of claim 1, further comprising adding a supplemental oil with the wall material slurry to form the heterogeneous mixture, wherein the supplemental oil is selected from the group consisting of avocado oil, Brazil nut oil, canola oil, corn oil, cottonseed oil, flaxseed oil, grape see oil, hemp seed oil, olive oil, palm oil, peanut oil, rice bran oil, safflower oil, sesame oil, soybean oil, walnut oil, hazelnut oil, sunflower oil, butterfat, oils that contain unsaturated fatty acids, oils that contains long-chain fatty acids, oils that contains short-chain fatty acids, and combinations thereof.

16. The method of claim 1, further comprising combining the composite plant-MCT flour with at least one of another quantity of plant flour or another composite plant-MCT flour.

17. A composite plant-MCT flour manufactured according to the method of claim 1.

18. A method of manufacturing a composite plant-MCT flour, comprising:
   forming a wall material slurry comprised of water, plant flour, a protein, and at least one of an emulsifier or co-emulsifier, wherein:
      the plant flour is selected from the group consisting of gluten flour, gluten-free flour, low carbohydrate seed, nut, or vegetable flour, and combinations thereof;
      the protein is selected from the group consisting of pea protein, hemp protein, pumpkin seed protein, rice protein, soy protein, sunflower seed protein, sacha inchi protein, chia protein, quinoa protein, whey protein, casein, egg protein, beef protein, chicken protein, fish protein, collagen, and combinations thereof;
      the emulsifier, when included, is selected from the group consisting of gum Arabic, acacia fiber, xanthan gum, guar gum, gellan gum, carrageenan, locust bean gum, pectin, starch, soy lecithin, egg lecithin, agar-agar, dextrin, monoglyceride, diglyceride, and combinations thereof, and
      the co-emulsifier, when included, is selected from the group consisting of calcium stearoyl lactylate, sodium stearoyl lactylate, cetearyl alcohol, cetyl alcohol, calcium stearate, magnesium stearate, phosphates, polyglycerol esters, polysorbate, sorbitan monostearate, sucrose fatty acid ester, and combinations thereof;
   combining MCT oil and a supplemental oil with the wall material slurry to form a heterogeneous mixture, wherein the supplemental oil is selected from the group consisting of avocado oil, Brazil nut oil, canola oil, corn oil, cottonseed oil, flaxseed oil, grape see oil, hemp seed oil, olive oil, palm oil, peanut oil, rice bran oil, safflower oil, sesame oil, soybean oil, walnut oil, hazelnut oil, sunflower oil, butterfat, oils that contain unsaturated fatty acids, oils that contain long-chain fatty acids, oils that contain short-chain fatty acids, and combinations thereof;
   subjecting the heterogeneous mixture to high speed shearing to form an emulsion comprised of MCT and supplemental oil droplets at least partially encapsulated by the wall material, wherein shearing of the heterogeneous mixture causes release of polysaccharide from the plant flour to form modified plant flour depleted in polysaccharide, wherein at least some of the polysaccharide from the plant flour is incorporated into the wall material;
   forming the emulsion into micro-sized and/or nano-sized composite micelles comprising wall material that at least partially encapsulates the MCT and supplemental oil droplets; and
   spray-drying the composite micelles with heated air to remove water by evaporation and form dried composite plant-MCT flour particles,
   wherein the dried composite plant-MCT flour particles comprise MCT and supplemental oil droplets encapsulated by a dried wall structure comprised of the protein, polysaccharide released from the plant flour, and at least one of the emulsifier or co-emulsifier.

19. A method of manufacturing a composite plant-MCT flour, comprising:
   forming a wall material slurry comprised of water, a quantity of plant flour, pea protein, gum Arabic, and at least one of calcium stearoyl lactylate or sodium stearoyl lactylate, wherein:
   combining MCT oil, and optionally a supplemental oil, with the wall material slurry to form a heterogeneous mixture;
   subjecting the heterogeneous mixture to shearing to form an emulsion comprised of MCT oil droplets at least partially encapsulated by with the wall material, wherein shearing of the heterogeneous mixture causes release of polysaccharide from the plant flour to form modified plant flour depleted in polysaccharide, wherein at least some of the polysaccharide from the plant flour is incorporated into the wall material;
   forming the emulsion into micro-sized and/or nano-sized composite micelles comprising wall material that at least partially encapsulates the MCT oil droplets;
   spray-drying the composite micelles with heated air to remove water by evaporation and form dried composite plant-MCT flour particles, wherein the dried composite plant-MCT flour particles comprise MCT oil droplets encapsulated by a wall structure comprised of the pea protein, polysaccharide released from the plant flour, gum Arabic, and at least one of calcium stearoyl lactylate or sodium stearoyl lactylate; and
   combining the composite plant-MCT flour and another quantity of plant flour and/or another composite plant-MCT flour.

20. The method of claim 1, wherein the composite plant-MCT flour comprises clusters comprised of modified and unmodified plant flour particles.

* * * * *